(12) United States Patent
Edelmann et al.

(10) Patent No.: US 7,014,806 B2
(45) Date of Patent: Mar. 21, 2006

(54) METHOD FOR PRODUCING A THREE-DIMENSIONAL FIBER REINFORCED RING FRAME COMPONENT

(75) Inventors: Klaus Edelmann, Bremen (DE); Christian Weimer, Geiselberg (DE)

(73) Assignees: Airbus Deutschland GmbH, Hamburg (DE); Institut fuer Verbundwerkstoffe GmbH, Kaiserslautern (DE)

( * ) Notice: Subject to any disclaimer, the term of this patent is extended or adjusted under 35 U.S.C. 154(b) by 94 days.

(21) Appl. No.: 10/385,286

(22) Filed: Mar. 10, 2003

(65) Prior Publication Data

US 2003/0222371 A1 Dec. 4, 2003

(30) Foreign Application Priority Data

Mar. 8, 2002 (DE) ................................ 102 10 086
Nov. 6, 2002 (DE) ................................ 102 51 579

(51) Int. Cl.
*B29C 70/24* (2006.01)

(52) U.S. Cl. ...................... 264/152; 264/160; 264/257; 264/258; 264/266; 264/320; 264/324; 264/325; 264/328.1; 156/93

(58) Field of Classification Search ................ 264/152, 264/157, 257–258, 266, 320, 324, 325, 328.1, 264/160; 156/93
See application file for complete search history.

(56) References Cited

U.S. PATENT DOCUMENTS

| 4,254,599 A | | 3/1981 | Maistre |
| 4,622,091 A | * | 11/1986 | Letterman .................... 156/286 |
| 5,217,766 A | * | 6/1993 | Flonc et al. ................ 428/34.5 |
| 5,546,880 A | | 8/1996 | Ronyak et al. |
| 2003/0168775 A1 | | 9/2003 | Eberth et al. |
| 2003/0173019 A1 | | 9/2003 | Eberth et al. |
| 2004/0219251 A1 | | 11/2004 | Eberth et al. |

FOREIGN PATENT DOCUMENTS

| DE | 29 12 463 | 11/1979 |
| DE | 43 14 078 | 3/1994 |
| DE | 695 16 105 | 12/2000 |

* cited by examiner

*Primary Examiner*—Stefan Staicovici
(74) *Attorney, Agent, or Firm*—W. F. Fasse; W. G. Fasse

(57) ABSTRACT

A closed ring fiber reinforced frame structure is produced by first preparing a prepreg. A section of the prepreg is formed into a flange preferably after impregnation by folding the flange section along a folding line. The folding line is formed by securing a deformable or drapable fiber ribbon material, for example by sewing or stitching to a carrier substrate which is preferably also a fiber material. The sewing seam or stitching line becomes the folding line. The ribbon material is so secured to the carrier substrate that the fiber orientation of the ribbon material is uniformly distributed all around a ring component that is formed of the ribbon material on the substrate. The impregnated ring component with its substrate is then cured after the folding of the flange to complete the ring frame structure.

18 Claims, 2 Drawing Sheets

METHOD FOR PRODUCING A THREE-DIMENSIONAL FIBER REINFORCED RING FRAME COMPONENT

PRIORITY CLAIM

This application is based on and claims the priority under 35 U.S.C. §119 of German Patent Applications 102 10 086.1, filed on Mar. 8, 2002 and 102 51 579.1, filed on Jun. 11, 2002, the entire disclosure of which is incorporated herein by reference.

FIELD OF THE INVENTION

The invention relates to a method for producing a fiber prepreg that is then formed and cured to produce a fiber reinforced ring frame component particularly for aircraft windows. The fiber reinforced ring frame component is preferably round or oval and has a flange that extends all along the inner or outer circumference of the ring frame component.

BACKGROUND INFORMATION

Conventional window frames for jumbo aircraft are produced of aluminum sheet metal by die stamping operations, particularly for reasons of economy. However, due to the smaller density of carbon fiber reinforced composite materials which have a mechanical strength or stiffness similar to that of aluminum, one can expect to achieve a significantly smaller weight for structural components made of carbon fiber composite materials by respective production processes. Such processes involve cutting to size material patterns which are then precisely stacked one on top of the other. In order to achieve a torsion stiffness a carbon short fiber core prepreg material is used. However, such a short fiber prepreg has low mechanical characteristics and adds to the weight of the finished component. These carbon fiber composite processes or technologies achieve the required mechanical characteristics, however, the production under economically sustainable conditions has not been possible heretofore. Thus, the disadvantages of conventional fiber composite constructions are seen in the high effort and expense for manual operations and in the inadequate assurance that quality requirements are satisfied. However, the low weight of the structural components is an advantage particularly in aircraft construction.

Fiber textile materials have been tested for some time now, for example for the production of aircraft frame ribs. The main reason for the use of such textile materials is their drapability or deformability. However, substantial difficulties are encountered in the large scale use of fibers which are assembled according to the so-called tailored fiber placement methods, whereby the fibers are laid down and sewn together. The same difficulties are encountered when using spirally woven fabrics which are used in order to form reinforcements around a hole in the structural component. These difficulties are seen particularly in the expensive and involved production of the semifinished products and generally in the working of the fibers. In connection with the production of spirally woven fabrics, particularly an oval geometry of the frame to be formed entails substantial limitations with regard to the availability of such fabrics due to the complexity and the comparably expensive semifinished product manufactured by weaving or knitting. The tailored fiber placement method is at present still not suitable for a large scale production due to its low fiber depositing or layering speeds. Another disadvantage of the tailored fiber placement method is seen in that substantial inhomogenities in the fiber distribution and fiber orientation in the body of the layered fibers result when these layered fibers are shaped into a curved structure.

OBJECTS OF THE INVENTION

In view of the foregoing it is the aim of the invention to achieve the following objects singly or in combination:
  to provide a carbon fiber composite construction method that is significantly more economical compared to such conventional methods;
  to provide a method for using fiber reinforced materials on a large scale or large series production, in other words, the present method shall have features that are amenable to a high degree of automation while nevertheless assuring that quality requirements are met and that rejects are minimized;
  to assure a uniform fiber distribution or fiber density throughout the volume of the prepreg and finished product;
  to use textile fiber fabric materials that are sold as yard goods by the meter or yard and are readily available; and
  to avoid concentrating fibers toward the center of a round or ring-shaped component by bending or folding a portion of the ring component out of a flat orientation into an angled orientation relative to a given plane.

SUMMARY OF THE INVENTION

The above objects have been achieved according to the invention by first preparing a prepreg which is then formed into the desired ring frame shape which preferably has a rim for example with an L-sectional configuration. More specifically, a ring prepreg for a closed ring-shaped fiber reinforced frame structure having a substantially L-sectional configuration is produced according to the invention by the following steps:
a) providing a carrier substrate preferably of a woven textile fabric or ribbon fabric or as a circularly woven fabric hose material that has been flattened,
b) securing, along a folding line, a deformable or drapable fiber material having a given fiber orientation, to said substrate to form a ring component,
c) assuring with said securing that said given fiber orientation remains uniformly distributed all around said ring component, and
d) impregnating said ring component with a resin matrix material to form said ring prepreg.

The deformable or drapable fiber ribbon material is a woven or braided material in the form of a fabric or ribbon fiber material. This material is so draped and secured onto the substrate that initially the radially inwardly positioned section of the ribbon material forms folds or pleats in such a way that after folding the radially inner section away from the flat surface section the fiber orientation and fiber density remains uniformly distributed in the volume of both sections of the ribbon material. The two sections are separated or demarked from one another along a folding line that also is a stitching or sewing line.

The production of the ring-shaped fiber reinforced frame structure having an L-sectional configuration uses ring prepregs made as outlined above. The radially inner section of the deformable or drapable fiber ribbon material is folded along the folding line away from the plane defined by the carrier substrate to form one leg of the L-sectional configuration while the other leg of that configuration is formed by the flat section extending in parallel to the carrier substrate. In this folded out condition the prepreg is cured to finish the ring-shaped fiber reinforced frame structure.

It is a special advantage of the invention that the prepreg and final product can be produced economically by mass production steps such as sewing or stitching the deformable fiber ribbon material to the substrate along a folding line which assures a precise positioning of the substrate and ribbon material relative to each other. The stitching or seam also permits the radially inner section of the ribbon material to initially fold to maintain the desired uniform fiber orientation and fiber density distribution. Such a prepreg can be inserted into a molding tool to be impregnated for example by a resin injection technique. The uniformly distributed fiber orientation and density distribution achieved according to the invention is also an important advantage of the invention because it assures uniform strength characteristics of the finished frame component throughout the volume of the finished component. These uniform strength characteristics apply to the section that remains flat and in parallel to the substrate and to the folded out flange section. The section that remains flat and in parallel to the substrate may be easily provided with a row of holes for riveting the frame component to the body of an aircraft. Yet another advantage is seen in that the textile ribbon material or woven fabric or circularly woven hose material is readily available as mass produced items that can be purchased without problems in any desired quantity. It has been found that the homogeneity in the fiber distribution and fiber densities throughout the volume of the frame structure according to the invention is particularly achieved by fiber fabrics that have been sheered as compared to other fiber fabric materials that have not been sheered.

BRIEF DESCRIPTION OF THE DRAWINGS

In order that the invention may be clearly understood, it will now be described in connection with example embodiments, with reference to the accompanying drawings, wherein.

DETAILED DESCRIPTION OF A PREFERRED EXAMPLE EMBODIMENT AND OF THE BEST MODE OF THE INVENTION

Figure 1:
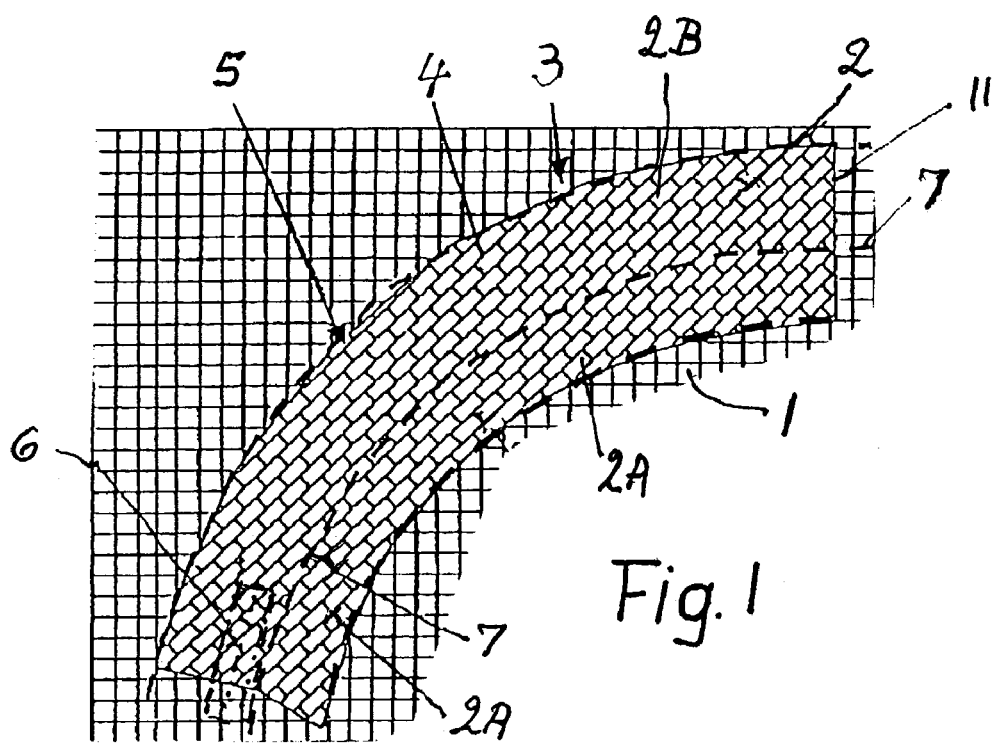
FIG. 1 is a schematic plan view of a deformable fiber ribbon material stitched or sewn to a carrier substrate, whereby only a sector is shown as representative of a complete ring component and a radially inward section of the ribbon material has not yet been folded into a flange position.

FIG. 1 shows a carrier material 1 cut off from a woven fiber mesh fabric such as glass fiber material or carbon fiber material. The shown square fiber orientation is preferred, but other fiber mesh orientations are also feasible, provided the strength requirements are satisfied. The carrier material 1 defines a plane that coincides or extends in parallel with the plane of the drawing sheet. A drapable or deformable fiber material 2 preferably a ribbon material that is secured to a substrate formed by the carrier material 1 by sewing or stitching along a stitching line 7 that also becomes a folding and securing line as will be described in more detail below. The deformable or drapable fiber material 2 is preferably a circularly woven hose material that can be flattened down in part and draped or folded in part without disturbing the given fiber orientation of such a fiber fabric. It will be noted that the stitching or folding line 7 divides the ribbon material into two sections, namely a radially inner section 2A and a radially outer section 2B. FIG. 1 only shows a sector of a ring component to simplify the illustration. Actually, the fiber material 2 also referred to as ribbon material will have a circular, oval or otherwise closed ring configuration 3. The stitching or folding line 7 is not disturbing the fiber orientation of the ribbon material 2 as seen in both sections 2A and 2B. This is possible because the radially inner section 2A can temporarily form folds or pleats not seen in FIG. 1. These folds or pleats will be folded away from the section 2B that remains flat in parallel to the substrate 1. The fiber material 2 can be cut from any type of fiber material, whereby the cutting line extends in such a direction that the fiber orientation 4 of the material 2 extends, for example at ±45° relative to the fiber orientation of the substrate 1. The material 2 may also be a socalled noncrimp fabric roving having, for example many fiber orientations in the various plies of the roving, whereby the crossing of the fibers or their orientation may again be ±45° relative to each other.

The carrier substrate 1, or rather its material, can be cut to such a dimension that it determines the dimensions of the frame component 3. The flat portion or section 2B may additionally be secured to the substrate 1 by a second sewing or stitching line 5, since the second section 2B remains flat on the substrate 1. Reinforcing patches 6 may be sewed or stitched to the radially outer section 2B or to the substrate 1 as seen in FIG. 1. These reinforcing patches 6 are preferably placed where the frame structure is exposed to extra peeling forces. Due to the use of mass produced fiber materials it is possible to obtain the advantages of circularly woven hose material for the production of closed ring-shaped fiber reinforced frame structures or other reinforcing hardware components including frame structures, for example for aircraft windows.

The sewing or stitching line 7 assures that the two sections 2A and 2B of the fiber fabric material 2 cannot change their fiber orientation 4 once the stitching is completed. The radially outer section 2B is flattened against the substrate 1 while the radially inner section 2A is draped or folded so that the fiber orientation 4 is not disturbed.

Figure 2:
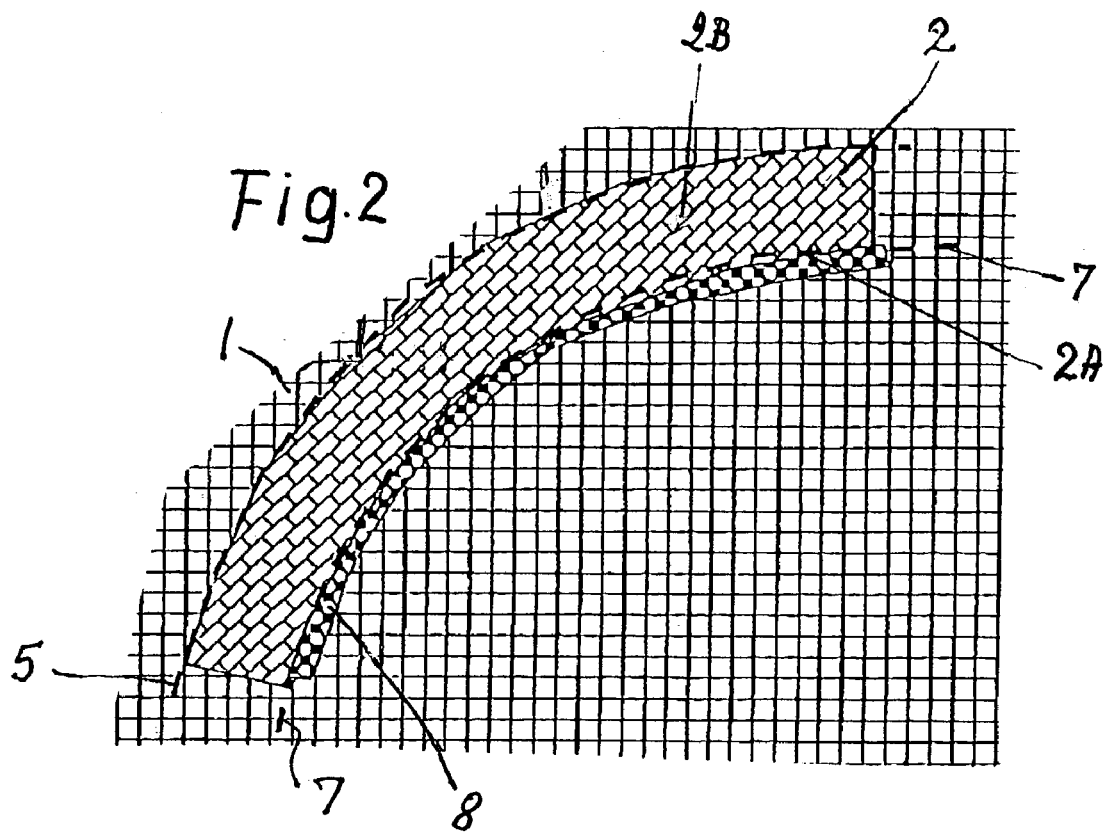
FIG. 2 is a view similar to that of FIG. 1, however illustrating the radially inwardly positioned section folded into the flange position.
Figure 4:
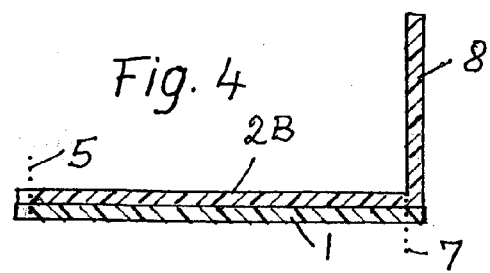
FIG. 4 is a sectional view along section line IV—IV in FIG. 3.

FIG. 2 shows that the radially inner section 2A has been folded out of the plane defined by the carrier material substrate 1 to form a flange 8 that has a uniform height all around the closed ring configuration 3 as best seen in FIG. 4 to be described below. The flange 8 can have any angular orientation relative to the plane defined by the substrate 1. However, a 90° orientation may be preferred. As mentioned above, the sewing or stitching line 7 functions as a folding line since the flange 8 extends precisely along the line 7. By placing the line 7 it is possible to determine the size of the radially outer section 2B and the size of the radially inner section 2A. In all of these embodiments the line 7 will run in parallel to the radially inner edge of the fiber material 2 and in parallel to the radially outer edge of the fiber material 2. Thus, it is possible to select the area size of these sections 2A and 2B and also the height of the flange 8. The percentage of the division will depend on the purposes of the closed ring component. For example, if a larger riveting area is required, the section 2B will have a larger surface area than the section 2A as shown in FIG. 1. The material of the outer section 2B will in any event be so dimensioned and cut to the proper size that a three-dimensional deformation of that portion of the ring structure is possible.

The reinforcing patches 6 may even be secured to the hose or ribbon material 2 while the latter is being produced in a mass production procedure. Once the flange 8 has been bent into the proper position relative to the plane of the substrate 1 the ring-shape may be stamped out or cut out of the substrate and impregnated with a resin impregnating method, for example in a manual laminating operation, a resin injection operation, or by the use of warmed-up resin fibers that form the matrix material for the fiber fabrics.

The final curing takes place preferably after the frame structure has been pressed into the desired ring-shape and after the flange 8 has been folded out of the plane of the substrate 1.

Figure 3:
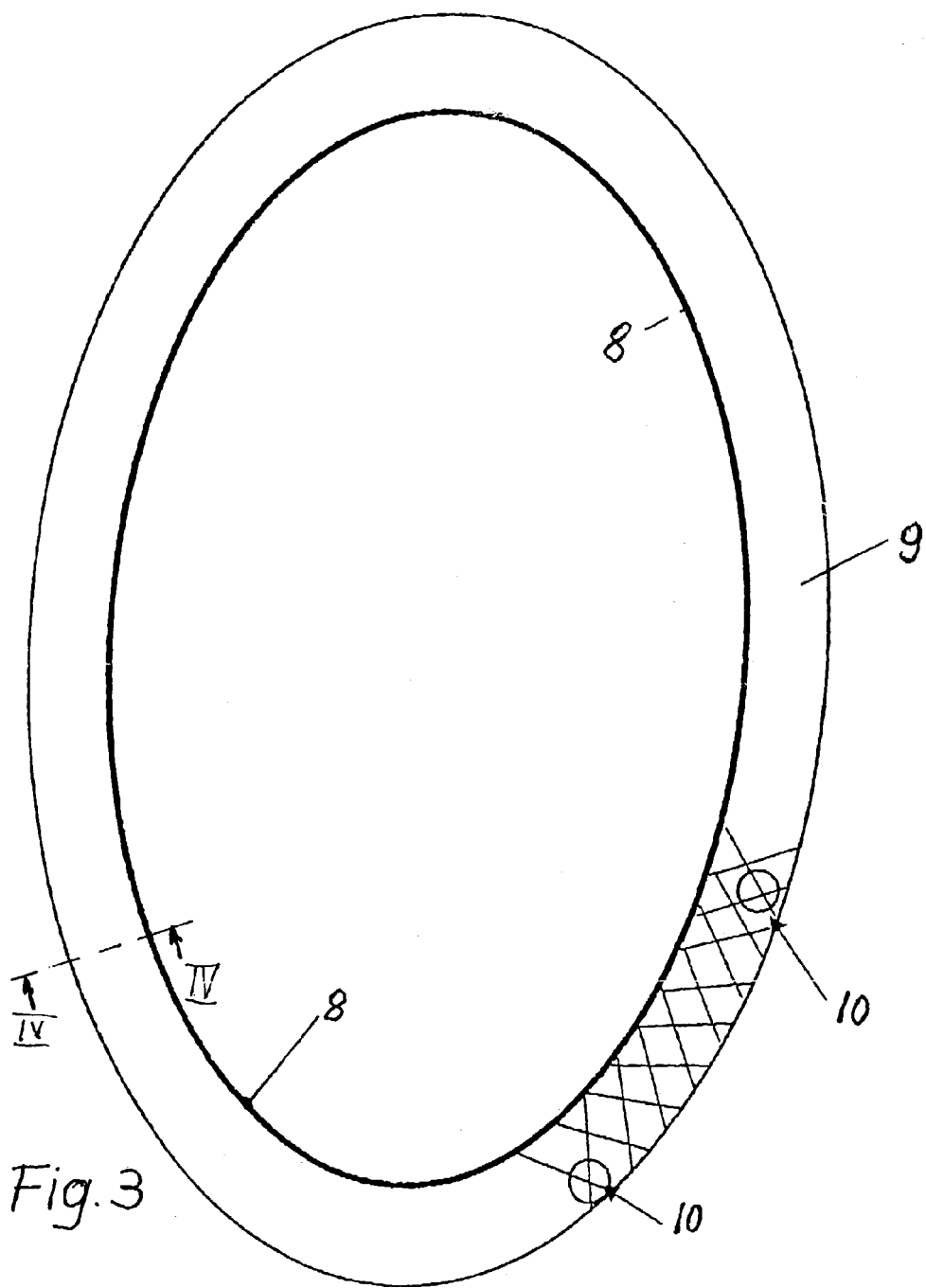
FIG. 3 is a plan view of a finished frame structure having a constant and uniform fiber orientation and distribution and a constant flange height all around the oval frame structure.

FIG. 3 shows the finished ring frame 9 having an oval shape and the radially inwardly positioned flange 8. According to the invention both the flat ring section and the flange 8 have the same fiber orientation. This can be checked by test holes 10 which later may be used as rivet holes.

Advantages of the invention are seen particularly in the following features. The fiber orientation can be controlled both in the flange 8 and in the radially outer section 2B to thereby assure a uniform fiber and strength distribution throughout the entire volume of frame structure. Problems with fiber laying procedures have been avoided by using commercially available fiber textile materials. The manufacturing steps are precisely repeatable and the number of layers of reinforcing patches is freely selectable by placing at least one stitching or sewing line 7 or more than one line. It is possible to compact the fiber package by the stitching or sewing seams in the same procedure on sewing automated equipment, whereby a semicontinuous operation is possible. Moreover, the density and thus the weight of the frame structure is uniformly distributed around the entire frame structure. Moreover, the use of the substrate material does not add extra weight to the frame structure because regardless of what material such a frame structure is made of, it requires the flat ring section and the flange ring section. FIG. 4 illustrates the position of the two stitching or sewing lines 5 and 7 and a rectangular orientation of the flange 8 relative to the substrate 1. However, other angular orientations are also possible. The stitching or sewing line 5 is optional.

Referring further to FIG. 1, a seam 11 is formed by securing the two ends of the deformable fiber material to each other, for example by stitching, to form the closed ring configuration 3.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for producing a prepreg for manufacturing a closed fiber reinforced frame, said method comprising the following steps:
    a) providing a carrier substrate (1) made of fiber material defining a first plane,
    b) providing at least one ring section (2) of foldable fiber material having a given orientation of fibers relative to each other in said foldable fiber material,
    c) securing said at least one ring section (2) to said carrier substrate (1) along a folding line (7) thereby dividing said at least one ring section (2) into two ring portions (2A, 2B) so that one of said two ring portions (2A, 2B) becomes foldable to form a flange (8) for said frame in a second plane extending at an angle relative to said first plane without disturbing said given fiber orientation by said securing,
    d) and impregnating said carrier substrate (1) and said at least one ring section (2) with a resin matrix material to form said ring prepreg.

2. The method of claim 1, further comprising using as said carrier substrate (1) and as said foldable fiber material a respective woven or braided fiber fabric.

3. The method of claim 1, further comprising using a fiber fabric circularly produced hose material at least for one of said carrier substrate (1) and said foldable fiber material forming said ring section (2) and flattening said hose material into a ribbon prior to said securing step.

4. The method of claim 1, further comprising using a flat sheet or web fiber structure for said carrier substrate (1).

5. The method of claim 1, further comprising using one of glass fiber material and carbon fiber material for said carrier substrate (1) and for said foldable fiber material forming said at least one ring section (2).

6. The method of claim 1, further comprising cutting said carrier substrate (1) to such a shape that said carrier substrate provides a support for at least one portion of said two portions (2A, 2B) of said at least one ring section (2).

7. The method of claim 1, further comprising shaping, prior to said securing step, said foldable fiber material into said at least one ring section (2) and then performing said securing step.

8. The method of claim 1, further comprising performing said securing step by sewing or stitching said at least one ring section to said carrier substrate (1) along said folding line (7).

9. The method of claim 1, further comprising positioning said folding line (7) to extend in parallel between lateral edges of said at least one ring section (2) of said foldable fiber material thereby forming said two ring portions as a first radially inner ring portion (2A) and as a second radially outer ring portion (2B) of said foldable fiber material.

10. The method of claim 1, further comprising stitching reinforcing patches (6) to at least one of said carrier substrate (1) and said foldable fiber material.

11. The method of claim 1, further comprising performing said impregnating step by a resin injection operation.

12. The method of claim 1, further comprising performing said impregnating step by a resin film infusion operation.

13. The method of claim 1, further comprising sewing or stitching an additional securing line (5) in parallel to said folding line (7) for securing said carrier substrate and said foldable fiber material to each other along two lines.

14. A method for producing a ring shaped fiber reinforced frame having a flange (8), said method comprising the following steps:
    a) providing a carrier substrate (1) made of fiber material defining a first plane,
    b) providing at least one ring section (2) of foldable fiber material having a given orientation of fibers relative to each other in said foldable fiber material, c) securing said at least one ring section (2) to said carrier substrate (1) along a folding line (7) thereby dividing said at least one ring section (2) into two ring portion (2A, 2B) without disturbing said given fiber orientation by said securing,
d) impregnating said carrier substrate (1) and said at least one ring section (2) with a resin matrix material to form a ring prepreg,
e) folding one of said two ring portions (2A, 2B) of said foldable fiber material along said folding line (7) into a second plane extending at an angle relative to said first plane thereby forming said flange (8) in said ring prepreg, and
f) curing said ring prepreg including said flange (8).

15. The method of claim 14, further comprising performing said folding step so that said angle enclosed by said first and second plane is a right angle.

16. The method of claim 14, wherein said folding step is performed prior to said impregnating step.

17. The method of claim 14, further comprising securing two ends of said at least one ring section (2) to each other to form a closed ring.

18. The method of claim 14, further comprising using a fiber ribbon material or flattened fiber hose material as said deformable fiber material for forming said at least one ring section (2).

* * * * *

UNITED STATES PATENT AND TRADEMARK OFFICE
CERTIFICATE OF CORRECTION

PATENT NO. : 7,014,806 B2
APPLICATION NO. : 10/385286
DATED : March 21, 2006
INVENTOR(S) : Edelmann et al.

Page 1 of 1

It is certified that error appears in the above-identified patent and that said Letters Patent is hereby corrected as shown below:

Column 1
Line 9, replace "Jun. 11, 2002" by -- Nov. 6, 2002--

Column 4
Line 28, replace "socalled noncrimp" by -- so-called non-crimp--

Column 7
Line 3, after "two ring" replace "portion" by -- portions --

Signed and Sealed this

Fifth Day of September, 2006

JON W. DUDAS
*Director of the United States Patent and Trademark Office*